United States Patent [19]

Russell et al.

[11] Patent Number: 5,511,151
[45] Date of Patent: Apr. 23, 1996

[54] METHOD AND APPARATUS FOR UNWINDING IMAGE DATA

[75] Inventors: William C. Russell, Laguna Hills; H. Brad Emerson, Costa Mesa; Tony K. Ip, Lake Forest, all of Calif.

[73] Assignee: Canon Information Systems, Inc., Costa Mesa, Calif.

[21] Appl. No.: 896,367

[22] Filed: Jun. 10, 1992

[51] Int. Cl.$^6$ ................................................ H04N 7/01
[52] U.S. Cl. ........................................ 395/114; 395/115
[58] Field of Search ........................... 348/441, 450; 395/114, 115

[56] References Cited

U.S. PATENT DOCUMENTS

| | | | |
|---|---|---|---|
| 4,052,699 | 10/1977 | Micka et al. | 340/146.3 MA |
| 4,691,364 | 9/1987 | Fukuzawa et al. | 382/41 |
| 4,785,349 | 11/1988 | Keith et al. | 348/436 |
| 4,797,746 | 1/1989 | Ashcraft | 348/441 |
| 4,868,653 | 9/1989 | Golin et al. | 348/433 |
| 4,918,523 | 4/1990 | Simon et al. | 348/433 |
| 4,974,078 | 11/1990 | Tsai | 348/441 |
| 5,065,149 | 11/1991 | Marsh et al. | 340/793 |
| 5,079,630 | 1/1992 | Golin et al. | 348/441 |
| 5,079,739 | 1/1992 | Petersen | 395/800 |
| 5,122,873 | 5/1992 | Golin | 348/433 |

FOREIGN PATENT DOCUMENTS 61-252175  11/1986  Japan ........................ G06K 15/10

*Primary Examiner*—Mark R. Powell
*Assistant Examiner*—Steven P. Sax
*Attorney, Agent, or Firm*—Fitzpatrick, Cella, Harper & Scinto

[57] ABSTRACT

Method and apparatus for converting image data from row format into column format and a printer incorporating the same. A conversion circuit, which is responsive to writes to a first address space, is provided for converting the image data from the row format into the column format. A CPU writes the row format image data to the first address space whereupon the conversion circuit converts it to the second format. The CPU then writes image data to a second address space. In accordance with an unwind flag set by the CPU, either the converted image data or the original image data is stored in a memory. After the data has been written to memory, the CPU initiates a DMA transfer of the image data to a printer engine.

19 Claims, 11 Drawing Sheets

| BYTE ADDRESS IN DRAM (HEX) | | BYTE CONTENTS | | | | | | | |
|---|---|---|---|---|---|---|---|---|---|
| ROW1 | 0 | AA0 | AA1 | AA2 | AA3 | AA4 | AA5 | AA6 | AA7 |
|  | 1 | AA8 | AA9 | | | | | | |
|  | 2 | AA16 | | | | | | | |
|  | ⋮ | | | | | | | | |
|  | 2A2 | AA5392 | AA5393 | AA5394 | AA5395 | AA5396 | AA5397 | AA5398 | AA5399 |
| ROW2 | 2A3 | AB0 | AB1 | AB2 | AB3 | AB4 | AB5 | AB6 | AB7 |
|  | 2A4 | AB8 | AB9 | | | | | | |
|  | ⋮ | | | | | | | | |
|  | 545 | AB5392 | | | | | | | |
| ROW3 | 546 | AC0 | AC1 | AC2 | AC3 | AC4 | AC5 | AC6 | AC7 |
|  | 547 | AC8 | | | | | | | |
|  | ⋮ | | | | | | | | |
|  | 7E8 | AC5392 | | | | | | | |
| ROW4 | 7E9 | AD0 | AD1 | AD2 | AD3 | AD4 | AD5 | AD6 | AD7 |
|  | 7EA | AD8 | | | | | | | |
|  | ⋮ | | | | | | | | |
|  | ABB | AD5392 | | | | | | | |
| ROW5 | ABC | AE0 | AE1 | AE2 | AE3 | AE4 | AE5 | AE6 | AE7 |
|  | ABD | AE8 | | | | | | | |
|  | ⋮ | | | | | | | | |
|  | D2E | AE5392 | | | | | | | |
| ROW6 | D2F | AF0 | AF1 | AF2 | AF3 | AF4 | AF5 | AF6 | AF7 |
|  | D30 | AF8 | | | | | | | |
|  | ⋮ | | | | | | | | |
|  | FD0 | AF5392 | | | | | | | |
| ROW7 | FD1 | AG0 | AG1 | AG2 | AG3 | AG4 | AG5 | AG6 | AG7 |
|  | FD2 | AG8 | | | | | | | |
|  | ⋮ | | | | | | | | |
|  | 1274 | AG5392 | | | | | | | |
| ROW8 | 1275 | AH0 | AH1 | AH2 | AH3 | AH4 | AH5 | AH6 | AH7 |
|  | 1276 | AH8 | | | | | | | |
|  | ⋮ | | | | | | | | |
|  | 1517 | AH5392 | | | | | | | |
| ROW9 | 1518 | BA0 | BA1 | BA2 | BA3 | BA4 | BA5 | BA6 | BA7 |
|  | 1519 | BA8 | | | | | | | |
|  | ⋮ | | | | | | | | |
|  | A379 | HF5392 | | | | | | | |
| ROW63 | A37A | HG0 | HG1 | HG2 | HG3 | HG4 | HG5 | HG6 | HG7 |
|  | A37B | HG8 | | | | | | | |
|  | ⋮ | | | | | | | | |
|  | A61C | HG5392 | | | | | | | |
| ROW64 | A61D | HH0 | HH1 | HH2 | HH3 | HH4 | HH5 | HH6 | HH7 |
|  | A61E | HH8 | | | | | | | |
|  | ⋮ | | | | | | | | |
|  | A8BF | HH5392 | HH5393 | HH5394 | HH5395 | HH5396 | HH5397 | HH5398 | HH5399 |

|  | BYTE ADDRESS IN SRAM (HEX) | BYTE CONTENTS | | | | | | | |
|---|---|---|---|---|---|---|---|---|---|
| COLUMN 1 | D0000 | AA0 | AB0 | AC0 | AD0 | AE0 | AF0 | AG0 | AH0 |
|  | D0001 | BA0 | BB0 | BC0 | BD0 | BE0 | BF0 | BG0 | BH0 |
|  | D0002 | CA0 | CB0 | CC0 | CD0 | CE0 | CF0 | CG0 | CH0 |
|  | D0003 | DA0 | DB0 | DC0 | DD0 | DE0 | DF0 | DG0 | DH0 |
|  | D0004 | EA0 | EB0 | EC0 | ED0 | EE0 | EF0 | EG0 | EH0 |
|  | D0005 | FA0 | FB0 | FC0 | FD0 | FE0 | FF0 | FG0 | FH0 |
|  | D0006 | GA0 | GB0 | GC0 | GD0 | GE0 | GF0 | GG0 | GH0 |
|  | D0007 | HA0 | HB0 | HC0 | HD0 | HE0 | HF0 | HG0 | HH0 |
| COLUMN 2 | D0008 | AA1 | AB1 | AC1 | AD1 | AE1 | AF1 | AG1 | AH1 |
|  | D0009 | BA1 | BB1 | BC1 | BD1 | BE1 | BF1 | BG1 | BH1 |
|  | D000A | CA1 | CB1 | CC1 | CD1 | CE1 | CF1 | CG1 | CH1 |
|  | D000B | DA1 | DB1 | DC1 | DD1 | DE1 | DF1 | DG1 | DH1 |
|  | D000C | EA1 | EB1 | EC1 | ED1 | EE1 | EF1 | EG1 | EH1 |
|  | D000D | FA1 | FB1 | FC1 | FD1 | FE1 | FF1 | FG1 | FH1 |
|  | D000E | GA1 | GB1 | GC1 | GD1 | GE1 | GF1 | GG1 | GH1 |
|  | D000F | HA1 | HB1 | HC1 | HD1 | HE1 | HF1 | HG1 | HH1 |
| COLUMN 3 | D0010 | AA2 | AB2 | AC2 | AD2 | AE2 | AF2 | AG2 | AH2 |
|  | D0011 | BA2 | BB2 | BC2 | BD2 | BE2 | BF2 | BG2 | BH2 |
|  | D0012 | CA2 | CB2 | CC2 | CD2 | CE2 | CF2 | CG2 | CH2 |
|  | D0037 | HA6 | HB6 | HC6 | HD6 | HE6 | HF6 | HG6 | HH6 |
| COLUMN 8 | D0038 | AA7 | AB7 | AC7 | AD7 | AE7 | AF7 | AG7 | AH7 |
|  | D0039 | BA7 | BB7 | BC7 | BD7 | BE7 | BF7 | BG7 | BH7 |
|  | D003A | CA7 | CB7 | CC7 | CD7 | CE7 | CF7 | CG7 | CH7 |
|  | D003B | DA7 | DB7 | DC7 | DD7 | DE7 | DF7 | DG7 | DH7 |
|  | D003C | EA7 | EB7 | EC7 | ED7 | EE7 | EF7 | EG7 | EH7 |
|  | D003D | FA7 | FB7 | FC7 | FD7 | FE7 | FF7 | FG7 | FH7 |
|  | D003E | GA7 | GB7 | GC7 | GD7 | GE7 | GF7 | GG7 | GH7 |
|  | D003F | HA7 | HB7 | HC7 | HD7 | HE7 | HF7 | HG7 | HH7 |
| COLUMN 9 | D0040 | AA8 | AB8 | AC8 | AD8 | AE8 | AF8 | AG8 | AH8 |
|  | D0041 | BA8 | BB8 | BC8 | BD8 | BE8 | BF8 | BG8 | BH8 |
|  | DA8B7 | HA5398 | HB5398 | HC5398 | HD5398 | HE5398 | HF5398 | HG5398 | HH5398 |
| COLUMN 5400 | DA8B8 | AA5399 | AB5399 | AC5399 | AD5399 | AE5399 | AF5399 | AG5399 | AH5399 |
|  | DA8B9 | BA5399 | BB5399 | BC5399 | BD5399 | BE5399 | BF5399 | BG5399 | BH5399 |
|  | DA8BA | CA5399 | CB5399 | CC5399 | CD5399 | CE5399 | CF5399 | CG5399 | CH5399 |
|  | DA8BB | DA5399 | DB5399 | DC5399 | DD5399 | DE5399 | DF5399 | DG5399 | DH5399 |
|  | DA8BC | EA5399 | EB5399 | EC5399 | ED5399 | EE5399 | EF5399 | EG5399 | EH5399 |
|  | DA8BD | FA5399 | FB5399 | FC5399 | FD5399 | FE5399 | FF5399 | FG5399 | FH5399 |
|  | DA8BE | GA5399 | GB5399 | GC5399 | GD5399 | GE5399 | GF5399 | GG5399 | GH5399 |
| END | DA8BF | HA5399 | HB5399 | HC5399 | HD5399 | HE5399 | HF5399 | HG5399 | HH5399 |

FIG. 6(c)

METHOD AND APPARATUS FOR UNWINDING IMAGE DATA

BACKGROUND

1. Field of the Invention

The present invention pertains to a method and apparatus for reformatting image data prior to printing the data on a printer, and in particular to a method and apparatus for reformatting from a row format to a column format in situations where the image data is sent to the printer row-by-row but where the printer prints the image data column-by-column.

2. Description of the Related Art

Printing apparatuses are widely used in connection with data processing, office automation and personal computer equipment. With advances in technology, it is now possible for printers to have a print head that includes many print elements that are closely spaced with respect to each other. For example, one type of printer currently available includes a single print head having 64 bubble jet nozzles arranged in a single column. Such an arrangement permits speedier printing because an entire "band" of print information can be printed with a single sweep of the print head across the printer carriage.

Image data to be printed by such a printer is ordinarily stored in a bit map memory, that is, each pixel of image data is represented by a separate bit in a byte addressable memory. Due to the above-described structure of the print head, it is advantageous to organize the bit map memory in columns of image data. This organization is advantageous because it allows the print head to print pixels of image data in the same order as bits of image data are read out from the bit map memory.

FIG. 8(a) depicts the desired column-ordered organization for the bit map memory of a band of image data for a typical printer which includes a print head having 64 bubble jet nozzles arranged in a vertical column. The carriage width for the printer is 15 inches across which is printed at 360 dots per inch ("dpi"). Accordingly, as shown in FIG. 8(a), each band of bit map image data is 5400 bits across and 64 bits high. The individual bits in the bit map memory are sequentially ordered in columns. That is, the first 64 bits of bit map memory, namely bits 0 through 63, correspond to the first column of pixels printed by the print head, the second 64 bits of bit map memory, namely bits 64 through 127, correspond to the second column of pixels and so on through the last 64 bits of bit map memory, namely bits 345536 through 345599, which correspond to the 5400th column of pixels printed by the print head.

Typically, the image data in a bit map memory is generated by a host CPU which executes an application program, and the image data is generated and stored in the bit map memory in accordance with the application program. In contrast to the column organization shown in FIG. 8(a), most application programs typically generate image data in row order and store the image data in rows. FIG. 8(b) shows this row-ordered organization for the same band of image data shown in FIG. 8(a). The first row includes bits 0 through 5399, the second row contains bits 5400 through 10799, and so on through the 64th row which contains bits 340200 through 345599.

In the case where the application program in the host computer generates and stores image data in the order shown in FIG. 8(b), it is not possible for a printer of the type in question to print the image data because the individual bits are read from memory in the wrong order. Nor is it practical to skip through a row-ordered bit map memory so as to read out the image data in column order. This is because the bits in bit map memory are grouped into eight bit units called "bytes". For example, referring either to FIG. 8(a) or FIG. 8(b), the first byte contains bit 0 through bit 7, the second byte contains bit 8 through 15, and so on through the 43200th byte. This byte organization makes it difficult to access individual bits within the bytes, and in particular makes it difficult to read, for example, first bit 0 from the first byte in FIG. 8(b), then bit 5400 from the 676th byte, and so on.

To reformat the bit map image data from the FIG. 8(b) row-ordered format to the FIG. 8(a) column-ordered format, it has been considered to program the host CPU to extract desired bits from the FIG. 8(b) bit map memory and to construct a bit map memory in accordance with FIG. 8(a). For several reasons, such an arrangement has proven unsatisfactory. First, because of the byte organization of the bits in the bit map memory, the bit-wise extraction and construction of bit map image memories is a time consuming and CPU-intensive process. The host CPU is well-suited for operating on bytes, but it is not well-suited for operating on individual bits within the byte. Thus, for example, to extract an individual bit from a byte requires the CPU to perform shift operations, masking operations and Boolean logic operations. Similarly, to add a bit to a byte requires Boolean logic operations. Each of these operations takes a finite amount of time and when multiplied by the number of bits in a band (345,600 in the case of FIG. 8(b)) results in unacceptably slow operation. This is especially true in the case of halftone or color image data where several bit map planes may be required.

Second, the primary task for the host CPU is to execute the application program. Any other tasks such as bit map conversions detract from the time available for the host CPU to execute the application program and unacceptably reduce performance.

Third, even if bit map conversion could be accomplished in an acceptably short period of time, the conversion steps required in one type of microprocessor, e.g., an Intel 80386, might not necessarily be the same as those required in a second type of microprocessor, e.g., a Motorola 68000. This is because bit operations are at the most fundamental level of a microprocessor. Accordingly, bit operations for one type of microprocessor are different from bit operations of another type of microprocessor, and a different set of print instruction steps would be needed for each individual type of microprocessor.

It has also been considered to provide a microprocessor in the printer's controller for performing the FIG. 8(b) to FIG. 8(a) conversion. This has also proven to be unsatisfactory because it simply transfers the above noted problems from the host CPU to the printer controller's CPU. Moreover, this approach requires the controller to have a highly sophisticated microprocessor which is inconsistent with the low cost objective for the controller.

SUMMARY OF THE INVENTION

The present invention solves the above problems by providing a method and apparatus for reformatting (or unwinding) graphics images in a bit map memory from a row-ordered format to a column-ordered format.

In one aspect, the invention is an apparatus for reformatting image data from a first format into a second format comprising converting means responsive to image data written to a first address space for converting the image data from the first format to the second format, selecting means for selecting the first format or the second format, and output means responsive to image data written to a second address space for outputting either the image data written to the second address space or the image data converted by said converting means in accordance with the selection by said selecting means.

In another aspect, the invention is an apparatus for reformatting image data from a first format into a second format comprising writing means for writing the image data to a second address space, converting means responsive to said writing means writing image data to the first address space, said converting means for converting the image data from the first format into the second format, and outputting means responsive to said writing means writing to the second address space, said outputting means for outputting data converted by said converting means.

In another aspect, the invention is a printer comprising a serial interface, a printer engine including a print head adapted to print plural rows of print information simultaneously, and a controller for controlling said printer engine in accordance with image data and commands received on said serial interface, said controller including conversion means responsive to image data written to a first address space for converting the image data from a first format into a second format, and output means for outputting the converted image data to said printer engine, said output means being responsive to image data written to a second address space.

In another aspect, the invention is a printer comprising a serial interface adapted to receive serial image data, a printer engine including a print head adapted to print plural rows of image data simultaneously, a first memory for storing process steps that select a first or a second format, that write image data to a first address space and to a second address space, and that initiate a direct memory transfer, or DMA transfer, from the second address space to said printer engine, process means for executing the process steps stored in said first memory, converting means responsive to said process means writing to the first address space for converting image data from the first format to the second format, a second memory responsive to said process means writing to the second address space for storing image data, selection means for selecting the first format or the second format in accordance with the process step executed by said process means, said selection means for causing the second memory to store converted image data from said conversion means or unconverted image data in accordance with the selected format, and a DMA channel for initiating DMA transfer from said second memory to said printer engine.

In another aspect, the invention is a method for converting image data from a first format to a second format comprising the steps of writing first format image data to a first address space, converting first format image data written to the first address space into second format image data, writing to a second address space, and storing data converted in said converting step in response to writing to the second address space.

In another aspect, the invention is a method for printing image data comprising the steps of receiving image data and commands over a serial interface, writing the image data to a first address space, converting the image data written to the first address space from a first format into a second format, writing to a second address space, storing image data converted in said converting step in response to writing to the second address space, and printing the image data stored in said storing step.

BRIEF DESCRIPTION OF THE DRAWINGS

FIG. 3 is a diagram for explaining memory organization in the FIG. 2 controller;

FIGS. 4, comprising

FIG. 6(a) is a chart illustrating pixel layout, FIG. 6(b) is a diagram of row-ordered bit map image data, and FIG. 6(c) is a diagram of column-ordered bit map image data;

FIGS. 8(a) and 8(b) depict the arrangement of bits in a column-ordered bit map memory and a row-ordered bit map memory, respectively.

DETAILED DESCRIPTION OF THE PREFERRED EMBODIMENT

Figure 1:
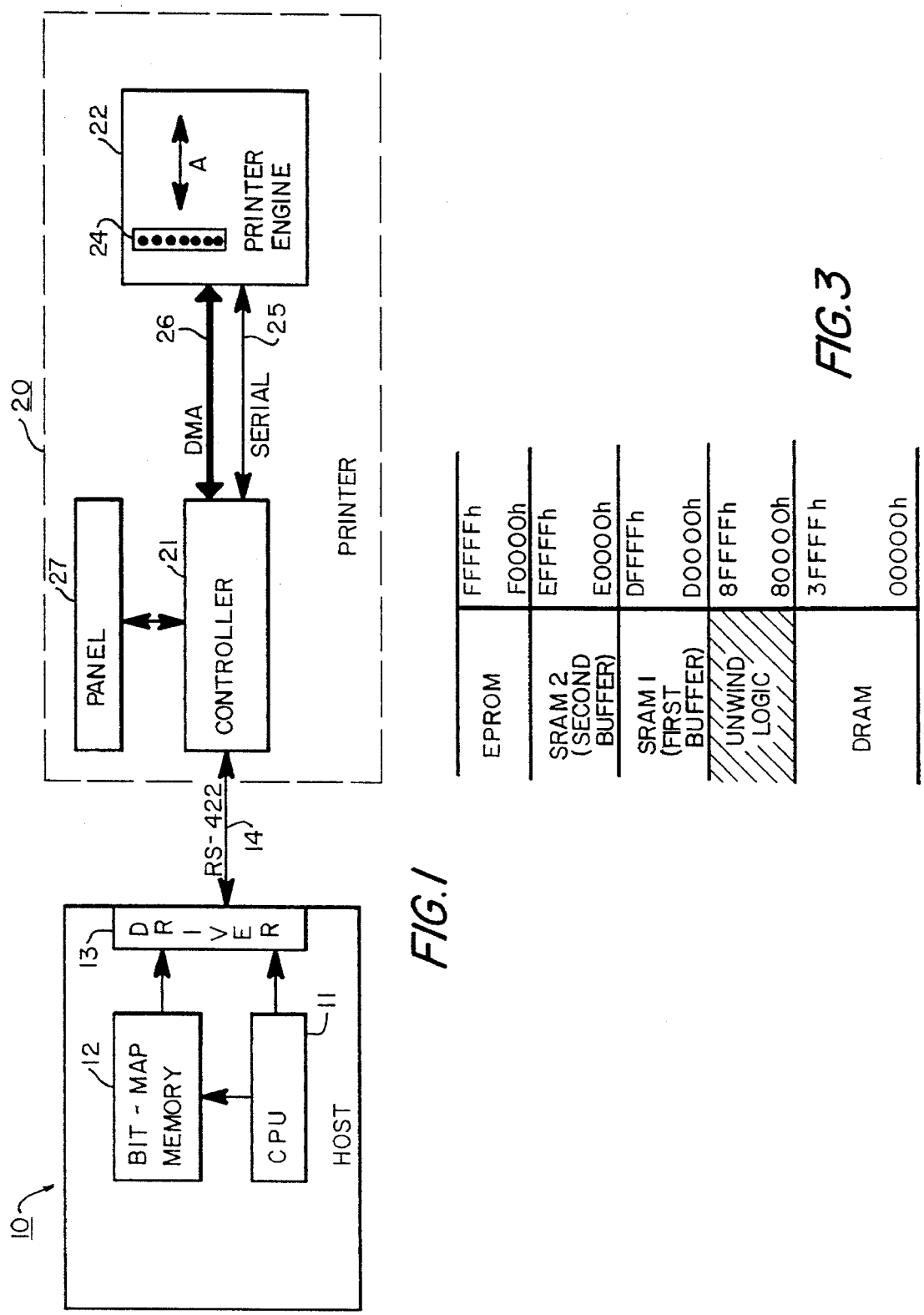
FIG. 1 is a block diagram showing a host CPU and a printer.

FIG. 1 depicts an overall block diagram of a host computer 10 interconnected with a printer 20. As shown in FIG. 1, host computer 10 includes CPU 11, bit map memory 12 and printer driver 13. As is known in the art, CPU 11 executes an application program which includes steps for forming a bit map image in memory 12.

To print the bit map image so formed, CPU 11 initiates a call to printer driver 13. The printer driver transmits commands to printer 20 over interface 14, for example, to configure the printer to accept a particular type of data or to interrogate the printer to determine the printer's condition. The printer driver then sequentially accesses each byte in bit map memory 12 and transmits the data over interface 14, such as an RS-422 serial interface, to printer 20.

The image data transmitted by the printer driver may be in compressed or uncompressed format. That is, rather than transmitting each and every byte in bit map memory 12, the printer driver may compress the data, for example through run-length or Huffman encoding, and transmit the compressed data so as to shorten the transmission time.

Printer 20 includes controller 21 which controls operation of printer engine 22 that includes a print head 24 having plural print elements arranged in a vertical column. Print head 24 is arranged in printer engine 22 to reciprocate across the printer's carriage in the direction indicated by double headed arrow A. Controller 21 communicates with printer engine 22 through a serial interface 25 so as to send and to receive commands to and from the printer engine. Actual print data, however, is transmitted from controller 21 to printer engine 22 through a direct memory access ("DMA") channel 26. Such an arrangement, though not necessary, is preferred since it frees controller 21 from overseeing the transfer of image data to the printer engine.

Controller 21 also interfaces with panel 27 located in the printer housing. The panel includes a number of control push buttons, a speaker, and a series of indicator lamps by which the operator can command specific operations (for example, form feed and on/off line) and by which the operator can monitor the status of the printer.

In response to the mixed transmission of image data and commands over interface 14, controller 21 receives the mixed transmission and separates commands from image data. The commands are executed. As for the data, if it is compressed, the controller uncompresses it and stores it in a bit map memory in the same order as bit map memory 12 in the host CPU. As explained more fully below, the controller then unwinds the image data from a row-ordered format into a column-ordered format and stores the unwound bit map image data for DMA transfer over DMA interface 26 to printer engine 22. The DMA transfer is coordinated over serial interface 25 in accordance with well-known techniques.

Figure 2:
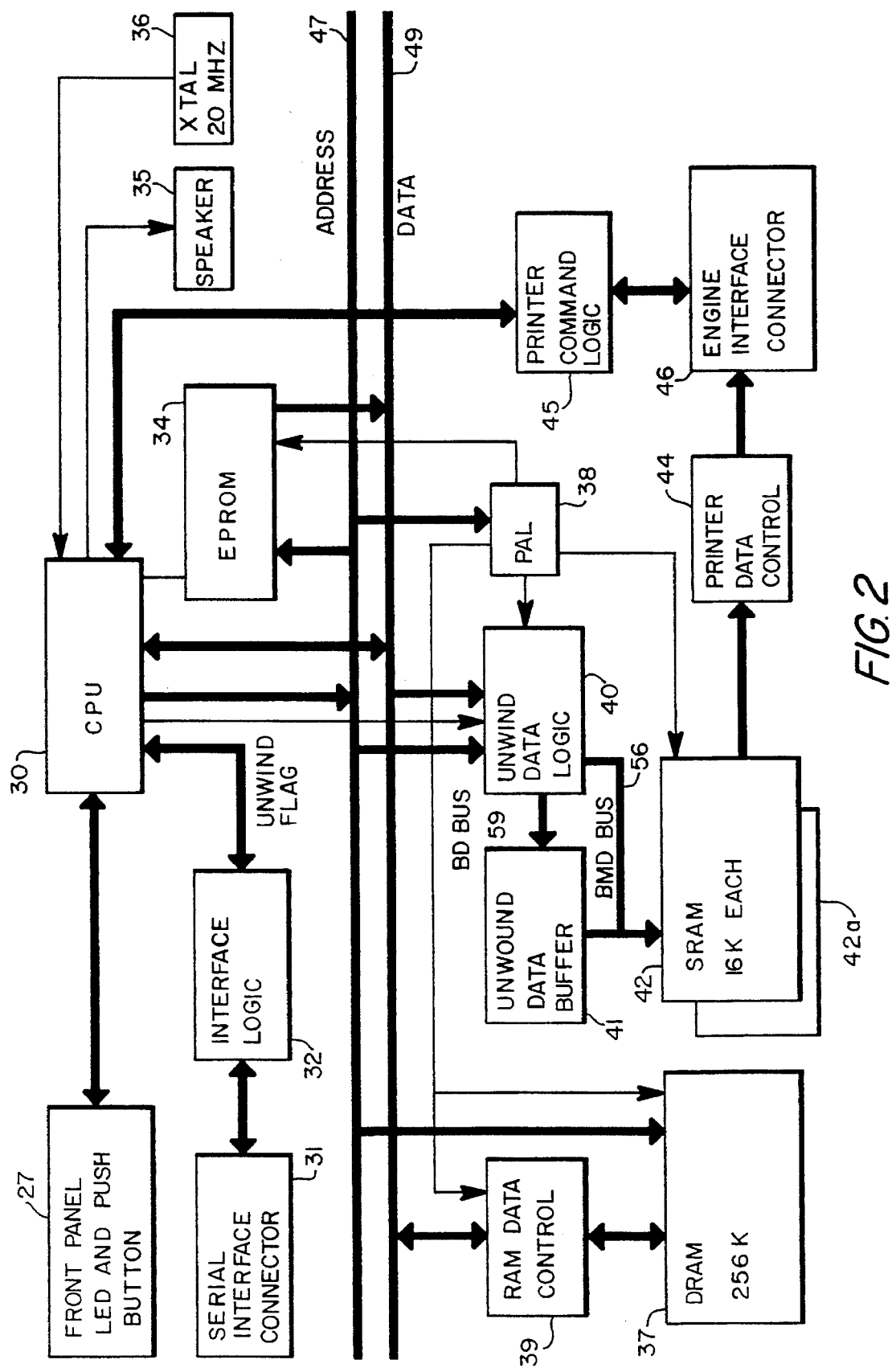
FIG. 2 is a block diagram showing a controller for the FIG. 1 printer.

FIG. 2 is a detailed block diagram of controller 21. As shown in FIG. 2, controller 21 includes a CPU 30 such as an NECV25 microprocessor. Controller 21 further includes interface connector 31 for connecting to the interface 14, interface logic 32 for converting the data on the interface into parallel data (if necessary) for use by the CPU 30, erasable programmable read only memory ("EPROM") 34 for storing process steps for execution by CPU 30, a speaker 35 and a crystal 36 for controlling the cycle time of CPU 30. Controller 21 further includes a dynamic random access memory ("DRAM") 37 and DRAM data control 39 for controlling access to DRAM 37. DRAM 37 is for storing uncompressed bit map image data received over interface 14 and also for storing commands received over interface 14.

Controller 21 further includes unwind data logic 40 for converting a row format bit map image data into column format bit map image data, unwound data buffer 41 for temporarily storing the unwound data, and static random access memory ("SRAM") 42 for storing column format bit map image data. It is preferable for SRAM 42 to be double buffered as depicted at 42a so as to permit construction of column format bit map image data simultaneously with DMA transfer of previously constructed bit map image data. Double buffering is controlled by programmable array logic ("PAL") 38, as more fully described below.

Actual DMA transfer to the printer engine is accomplished from printer data control 44 and printer command logic 45, both of which interface with printer engine interface connector 46. Connector 46 includes the aforementioned serial interface 25 for controlling the interface between the printer engine and the controller, and DMA channel 26 which permits printer engine 22 to access SRAM 42 directly.

Address bus 47 and data bus 49 are provided for routing data among the various components in the controller.

Memory organization in controller 21 is shown in FIG. 3 which gives correspondence between a memory address and a physical memory device. As shown in FIG. 3, memory addresses from 00000h (wherein "h" designates a hexadecimal number) through 3FFFFh correspond to DRAM 37. Memory addresses from 80000h through 8FFFFh do not correspond to any physical memory device; rather, when data is written to one of these addresses the data is directed to unwind data logic 40. Memory addresses from D0000h through EFFFFh refer to addresses in double-buffered SRAM 42 and 42a, wherein the addresses from D0000h to DFFFFh refer to the first buffer 42 and addresses from E0000h to EFFFFh refer to the second buffer 42a. Memory addresses from F0000h through FFFFFh correspond to EPROM 34. Activation of the particular device (i.e., EPROM 34, DRAM 37, unwind data logic 40 and SRAM 42) together with any desired double buffering is controlled by chip select signals from PAL 38 as described more fully below.

Figure 4A:
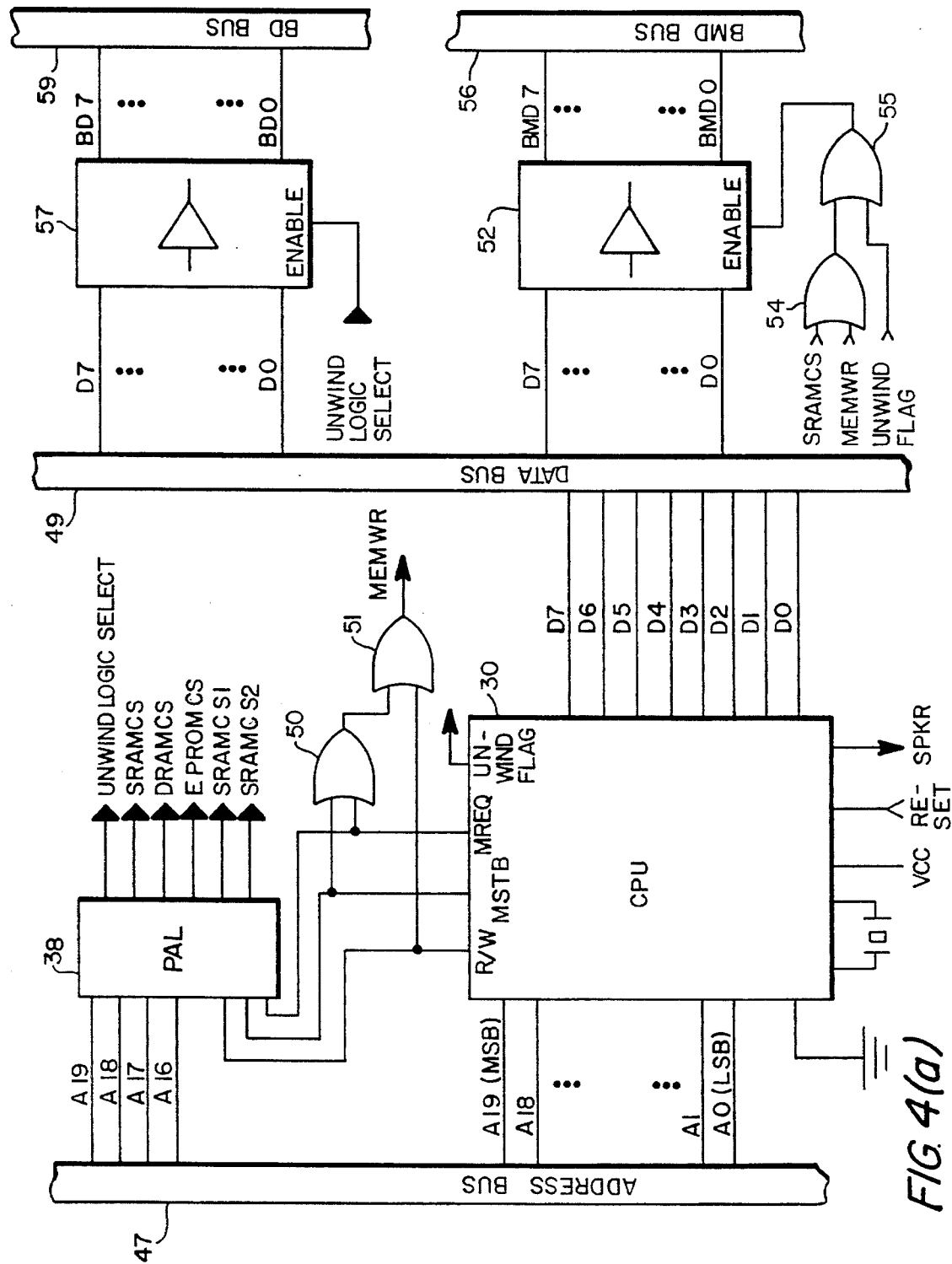
FIGS. 4(a), 4(b) and 4(c) are detailed block diagrams showing the unwinding logic of the FIG. 2 controller.
Figure 4B:
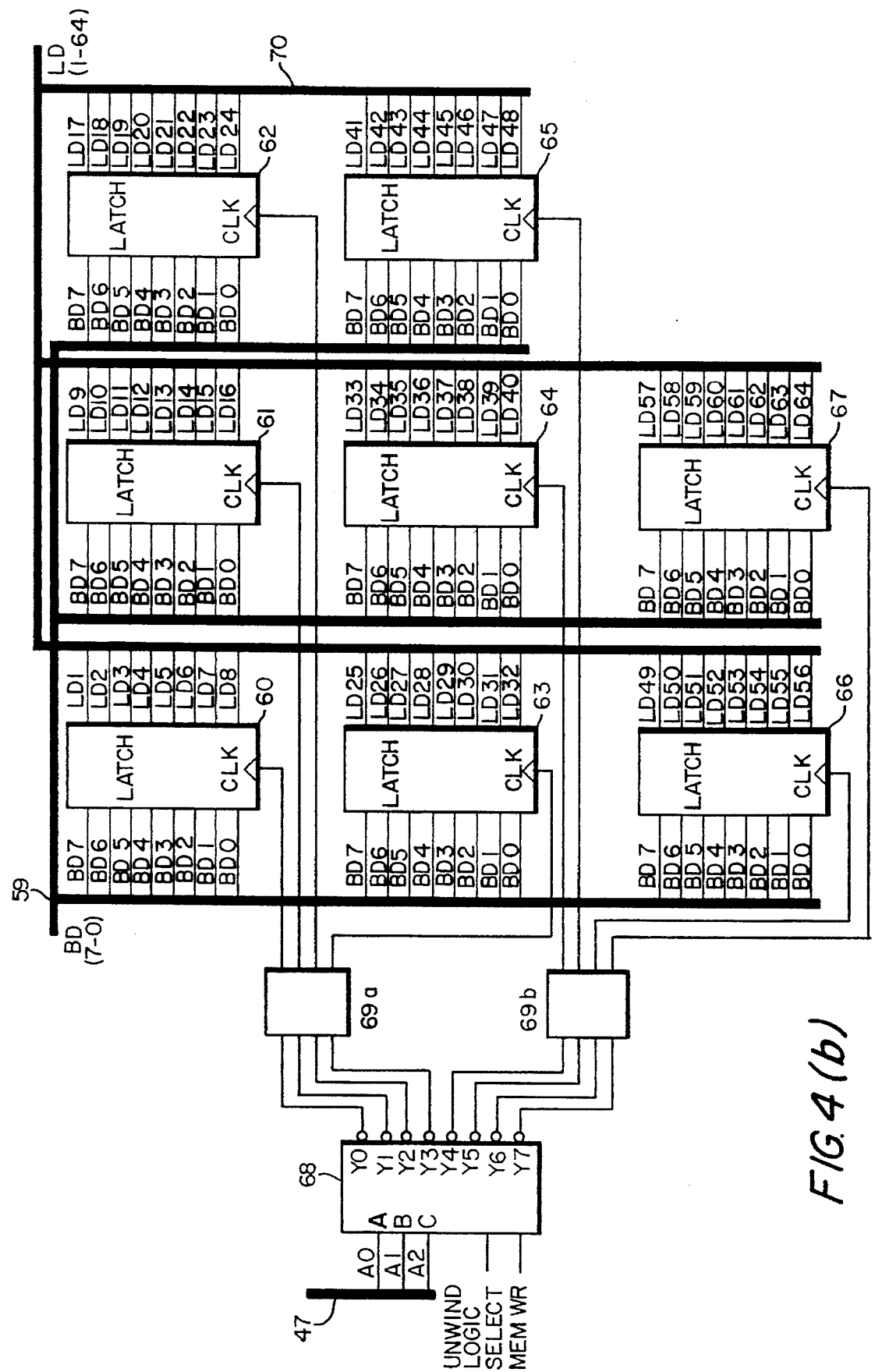
Figure 4C:
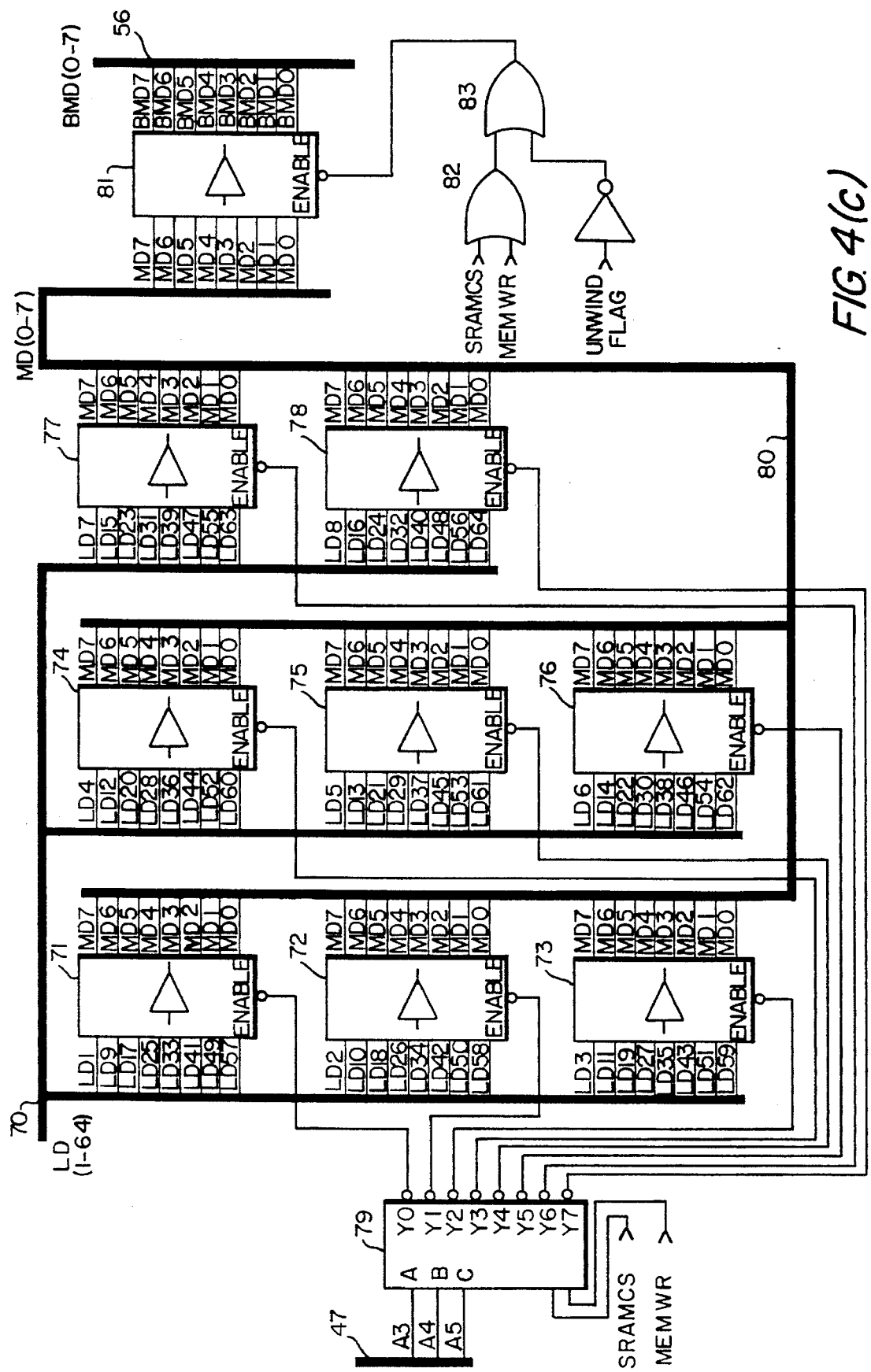

FIG. 4, comprising FIGS. 4(a), 4(b) and 4(c), provide a detailed block diagram of unwind data logic 40 as it interacts with other components in controller 21. As shown in FIG. 4(a) PAL 38 is provided with the four most significant address bits on address bus 47, as well as a read/write signal "R/W" from CPU 30, a memory strobe signal "MSTB" from CPU 30 and a memory required signal "MREQ" from CPU 30. Based on these signals, PAL 38 generates an unwind logic select signal when an address from 80000h to 8FFFFh appears on address bus 47, an SRAM chip select signal (SRAMCS) when an address from D0000h to EFFFFh appears on address bus 47, a DRAM chip select signal (DRAMCS) when an address from 0000h to 3FFFFh appears on address bus 47, an EPROM chip select signal (EPROMCS) when an address from F0000h to FFFFFh appears on address bus 47, and two chip select signals for the SRAM (SRAMCS1 and SRAMCS2) that coordinate double buffering for the SRAM in accordance with whether an address from D0000h to DFFFFh or from E0000h to EFFFFh appears on the address bus.

A pair of OR gates 50 and 51 are connected to the R/W, MSTB, and MREQ outputs of CPU 30 and generate a memory write signal (MEMWR).

In accordance with commands transmitted from driver 13 on interface 14, CPU 30 outputs an unwind flag (UNWIND) to permit de-selection of the unwind logic in the event that data transmitted by host computer 10 is already in the appropriate order. For example, in the case of landscape images, unwind logic may not be needed and the unwind flag is reset to zero.

Buffer 52 is provided to transfer each of image data bits d0 through d7 on data bus 49 directly to SRAM 42 via BMD bus 56 in the event that unwinding is not desired. Buffer 52 is enabled by OR gates 54 and 55 when an SRAM address appears on the address bus (as indicated by the SRAMCS signal from PAL 38), when the memory write signal appears, and when the unwind flag is low. When this combination of events occurs, buffer 52 is enabled and transfers the data on data bus 49 to BMD bus 56. The BMD bus 56, in coordination with double buffering as controlled by PAL 38, feeds data to SRAM 42 (or 42a) for subsequent DMA transfer to the printer engine (see FIG. 2).

To print image data in the event that unwinding is not desired, CPU 30 sets the unwind flag low. Then each byte of bit map memory is retrieved from DRAM 37 and written to SRAM 42. By writing to SRAM 42 with the unwind flag low, CPU 30 circumvents unwind logic 40 and causes the image data to be transferred directly to BMD bus 56 and stored directly in SRAM 42 for subsequent DMA transfer to the printer engine.

Buffer 57 is provided to transfer image data on data bus 49 to unwinding logic 40 in the event that unwinding is desired. With the unwind flag high (as set by CPU 30), buffer 57 is enabled when an address from 80000h to 8FFFFh appears on the address bus, as indicted by the unwind logic select signal from PAL 38, and transfers data bits d0 through d7 on data bus 49 to BD bus 59 for subsequent unwind processing.

As shown in FIG. 4(b), the BD bus is connected to each of eight 8-bit latches 60–67. The clock inputs for latches 60–67 are provided from monostable multivibrators 69a and 69b, the inputs for which are provided by multiplexer 68. Multiplexer 68 is enabled when an address from 80000h to 8FFFFh appears on address bus 47, as indicated by the unwind logic select signal from PAL 38, and when the memory write signal MEMWR is generated by NAND gate 5. When enabled, multiplexer 68 decodes the three least significant binary digits on the address bus (i.e., bits A0, A1 and A2) to select one of outputs y0 through y7. The selected output activates monostable multivibrator 69a or 69b which generates the clock signal for the selected corresponding latch.

In operation, CPU 30 retrieves a byte of row-ordered image data from the bit map image data in DRAM 37 and writes the row format byte to an address in the range from 80000h to 8FFFFh. PAL 38 detects the presence of this address on the address bus and generates the unwind logic select signal. The unwind logic select signal enables both buffer 57 and multiplexer 68. Buffer 57 transfers the image data byte to BD bus 59 and multiplexer 68 latches the transferred byte in accordance with the three least significant bits on the address bus 47. Eight bytes of image data from bit map memory in DRAM 37 are sequentially written in this manner to load each of latches 60–67 and provide 64 total bits of image information. The 64 bits of image information are provided to the LB bus 70 which, in turn, is connected to the inputs of buffers 71 through 78 shown in FIG. 4(c).

As shown in FIG. 4(c), each of buffers 71 through 78 includes eight inputs which are connected to corresponding ones of the outputs from latches 60 through 67. Thus, for example, the eight inputs for buffer 71 are respectively connected to bit LD1 from latch 60, bit LD9 from latch 61, bit LD17 from latch 62, etc. Through this interconnection, the row-ordered bytes of image data stored in latches 60 through 67 are converted to column-ordered bytes of image data.

Buffers 71 through 78 are enabled by the outputs of multiplexer 79. Multiplexer 79 is similar to multiplexer 68, but unlike multiplexer 68 multiplexer 79 decodes the next three least significant bits on address bus 47 (i.e., bits A3, A4 and A5). In addition, unlike multiplexer 68 which is enabled by a write to an address in the range 80000h to 8FFFFh, multiplexer 79 is enabled by writes to SRAM 42 or 42a, as indicated by the SRAMCS signal from PAL 38.

In operation, once eight bytes of image data have been latched into latches 60–67 (and, consequently, converted to column-format image data by buffers 71–78), CPU 30 writes eight bytes of data to SRAM 42 or 42a. Because the unwind flag is high, buffer 52 ignores the data written by CPU 30 during these writes and whatever data is written by the CPU to data bus 49 is not transferred to BMD bus 56. Rather, multiplexer 79 is enabled by the SRAMCS signal and sequentially activates buffers 71–78 in accordance with bits A3, A4 and A5 on address bus 47.

As the buffers are actuated, the eight bits unwound by each buffer are placed on MD bus 80. The eight unwound data bits on MD bus 80 are buffered to BMD bus 56 by buffer 81 which is enabled in accordance with the SRAMCS signal, the memory write signal and the unwind flag, as processed by OR gates 82 and 83, respectively. Because the unwind flag is high, unwound, or column-ordered, data is placed on the BMD bus when CPU 30 writes to SRAM 42 or 42a. As before, the BMD bus, in coordination with double buffering controlled by PAL 38, feeds image data to SRAM 42 (or 42a) for subsequent DMA transfer to the printer engine.

In sum, to unwind data from row-ordered format to column-ordered format, CPU 30 first sets the unwind flag. Then, CPU 30 retrieves eight bytes of row-ordered data from bit map memory in DRAM 37 and writes the eight bytes to an address between 80000h and 8FFFFh. The eight bytes are latched into latches 60 through 67. CPU 30 then writes the eight bytes to an SRAM address whereupon buffers 71 through 78 place column-ordered data first onto the MD bus 80 and then onto the BMD bus 56. Data on the BMD bus 56 is channeled to SRAM 42 or 42a in coordination with double buffering from PAL 38. The double buffered data in SRAM 42 is then DMA-transferred to the printer engine under the control of printer control 44 and printer command logic 45.

Figure 6A:
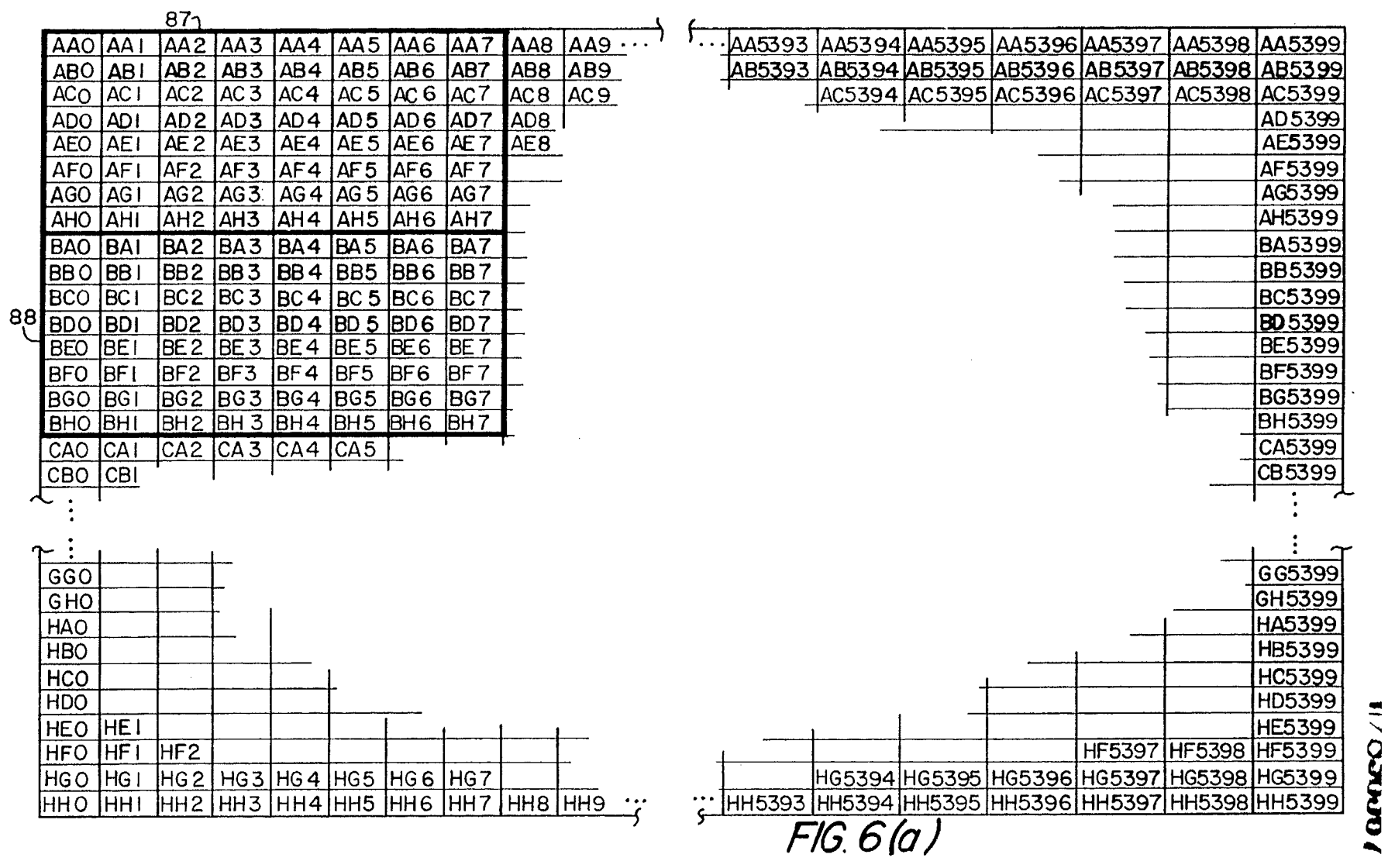

FIG. 6, comprising FIGS. 6(a), 6(b), and 6(c), are views for describing how CPU 30 selects specific bytes of row-ordered image data from DRAM 37 and unwinds them into column-ordered image data in SRAM 42.

FIG. 6(a) identifies each and every pixel in a band of image data suitable for the print head in question and provides a unique label for each pixel. The pixels are shown in their desired physical location on a print medium or other visualization medium. As shown in FIG. 6(a), pixels in the first row are all labelled "AA" followed by the column number (that is, AA0 through AA5399). Pixels in the second row are all labelled "AB" followed by the column number (that is, AB0 through AB5399), and so on until pixels in the 64th row which are all labelled "HH" followed by the column number (that is, HH0 through HH5399).

FIG. 6(b) shows how the pixels of FIG. 6(a) are stored in row-ordered bit map memory in DRAM 37. In FIG. 6(b), it is assumed that driver 13 has transmitted image data from bit map memory 12 in a row-by-row order. Other orders are possible and CPU 30 can be programmed through commands from the driver to respond to other orders. In particular, it is possible for driver 13 to send a command over interface 14 to CPU 30 so that CPU 30 expects data to be transmitted in a different order.

As shown in FIG. 6(b), in row-ordered bit map memory, pixels are stored in DRAM 37 sequentially by rows. Thus, the first byte (address 0h) in bit map memory contains the first eight pixels of row 1, namely bits AA0 through AA7. The second byte (address 1h) continues row 1 and contains bits AA8 through AA15 and so on through the end of row 1, corresponding to the 675th byte (address 2A2h) which contains bits AA5392 through AA5399.

The second row in row-ordered bit map memory begins at the 676th byte in DRAM (corresponding to address 2A3h) and contains bits AB0 through AB7. This sequence continues until the 64th row in bit map memory which begins at the 42526th byte in bit map memory (corresponding to address A61Dh) which contains bits HH0 through HH7, and ends at the 43200th byte in bit map memory (corresponding to address A8BFh) which contains bits HH5392 through HH5399.

FIG. 6(c) shows the column-ordered bit map memory stored in SRAM 42 which results after unwind-processing the row-ordered data in DRAM 37, and which is suitable for printing by the print engine shown in FIG. 2. FIG. 6(c) depicts the addresses corresponding to the first buffer in double-buffered SRAM, that is, addresses from D0000h through DFFFFh. It should be understood that FIG. 6(c) is equally applicable to SRAM 42a, that is, the other buffer of the double-buffered SRAM, in which case addresses range from E0000h through EFFFFh.

As shown in FIG. 6(c), in column-ordered bit map memory, pixels are stored in SRAM sequentially by columns. Thus, the first byte in bit map memory (address D0000h) contains the first eight pixels of column 1, namely bits AA0 through AH0. The second through seventh bytes (corresponding to addresses D0001h through D0007h) complete column 1 and contain bits BA0 through HH0.

The second column in column-ordered bit map memory begins at the eighth byte of SRAM (corresponding to address D0008h) and contains bits AA1 through AH1. The second column continues with the ninth through fifteenth bytes in SRAM (corresponding to addresses D0009h through D000Fh) and contains bits BA1 through HH1.

The third through 5400th columns are likewise arranged in column order beginning with the 16th location in SRAM (corresponding to address D0010h), continuing through the beginning of the 5400th column (corresponding to address DA8B8h) which contains bits AA5399 through AH5399, and ending at the 43200th byte of SRAM memory (corresponding to address DA8BFh) which contains bits HA5399 through HH5399.

To reformat the row-ordered bit map memory shown in FIG. 6(b) into the column-ordered bit map memory shown in FIG. 6(c), CPU 30 processes eight-by-eight bit blocks of image data one at a time until the entire band of image data has been processed. In the embodiment described here, CPU 30 processes eight-by-eight bit blocks of data proceeding from the left side of the band to the right side, but this should not be considered limiting. The arrangement is, however, preferable, especially in an embodiment where the SRAM is not double-buffered, since it allows print head 24 to begin left-to-right printing before a complete band of image data has been processed. If this advantage is desired, image unwind processing direction should proceed in correspondence with the printing direction, for example, right-to-left, or alternating directions.

For each eight-by-eight bit block of image data, CPU 30 accesses each of the eight bytes of image data in DRAM 37 that constitute the rows in the block. Most conveniently, the rows are accessed in row order, that is, the first row is accessed first and the eighth row is accessed last, but this is not essential.

For the band of image data shown in FIG. 6(a), CPU 30 begins unwinding with DRAM image data corresponding to eight-by-eight bit block 87 which is the upper left-most eight-by-eight bit block of image data. CPU 30 accesses the first row in block 87 which is found in the first byte in DRAM 37 (corresponding to address 0h) and contains bits AA0 through AA7. CPU 30 writes this byte to address 80000h which is obtained by adding 80000h to the DRAM address. As described above, PAL 38 detects that data has been written to this address and sets the unwind logic select signal. Accordingly, the data so written is latched into one of latches 60 through 67 in accordance with the three least significant bits on address bus 47 as decoded by multiplexer 68. In the particular instance of address 80000h, bits AA0 through AA7 are latched into latch 60.

CPU 30 then accesses the second row of block 87 which is found in the 676th location in DRAM 37 (corresponding to address 2A3h) and which contains bits AB0 through AB7. Again, 80000h is added to this address and the data from DRAM 37 is written to location 802A3h. The three least significant bits of this address are decoded by multiplexer 68 so as to cause bits AB0 through AB7 to be latched into latch 61.

The process is continued for remaining rows 3 through 8 in block 87 (corresponding to DRAM addresses 546h, 7E9h, ABCh, D2Fh, FD1h and 1275h) thereby causing corresponding bits to be latched into latches 62 through 67. In particular, bits AC0 through AC7 are latched into latch 62, bits AD0 through AD7 are latched into latch 63, bits AE0 through AE7 are latched into latch 64, bits AF0 through AF7 are latched into latch 65, bits AG0 through AG7 are latched into latch 66, and bits AH0 through AH7 are latched into latch 67.

By virtue of the above-described interconnection of latches 60 through 67 to buffers 71 through 78, unwound, column-ordered image data is ready to be transferred from buffers 71 through 78 into SRAM. Specifically, because of the interconnection, buffer 71 stores bits AA0 through AH0: bit AA0 from latch 60, bit AB0 from latch 61, bit AC0 from latch 62, and so on. Likewise, buffer 72 stores bits AA1 through AH1, buffer 73 stores bits AA2 through AH2, buffer 74 stores bits AA3 through AH3, buffer 75 stores bits AA4 through AH4, buffer 76 stores bits AA5 through AH5, buffer 77 stores bits AA6 through AH6, and buffer 78 stores bits AA7 through AH7. CPU 30 transfers bits from these buffers 71 to 78 by writing a data word (any data word) to the appropriate SRAM address. As described above, if the unwind flag is set, the actual data appearing on data bus 49 is ignored; rather, data appearing on MD bus 80 is transmitted to SRAM 42 via BMD bus 56.

Assuming that the eight-by-eight bit block of image data consisting of bits AA0 through AH7 have been latched into latches 60 through 67 and unwound onto buffers 71 to 78, as described above, CPU 30 writes first to SRAM address D0000h. Bits A3, A4 and A5 on the address bus are decoded by multiplexer 79 to activate buffer 71 and to cause bits AA0 through AH0, which correspond to the first column of block 87, to be stored in SRAM at location D0000h. CPU 30 next writes to SRAM address D0008h. Again, multiplexer 79 decodes bits A3, A4 and A5 on the address bus to activate buffer 72 and to cause bits AA1 through AH1, corresponding to the second column in block 87, to be stored in SRAM at location D0008h. Likewise, CPU 30 transfers the bits from buffers 73 to 78 by writing to SRAM at addresses D00010h, D0018h, D0020h, D0028h, D0030h and D0038h thereby causing the remaining bits (that is, bits AA2 through AH7) to be stored at those addresses in SRAM.

With the first eight-by-eight block of image data transformed into column-ordered format, CPU 30 selects the next eight-by-eight block of image data which in this case is block 88 in FIG. 6(a) corresponding to rows 9 through 16 and columns 1 through 8. As before, CPU 30 accesses DRAM corresponding to the rows in block 88, adds 80000h to the addresses accessed, and writes the words so as to latch them into latches 60 through 67. In this case, bits BA0 through BH7, from block 88 are latched into latches 60 through 67. CPU 30 then writes to addresses D0001h, D0009h, D0011h, D0019h, D0021h, D0029h, D0031h and D0039h so as to cause these bits to be transferred from buffers 71 to 78, in column-ordered format, and stored in SRAM as continuations of columns 1 through 8, respectively.

The process proceeds with the next lower eight-by-eight bit block of image data until the first eight columns have been transformed from row-ordered format in DRAM 37 into column-ordered format in SRAM 42. At this point, processing reverts to the next right-most eight-by-eight bit block which corresponds to the first eight rows of image data and the second eight columns of image data in FIG. 6(a). In DRAM 37, the image data is at DRAM addresses 0001h, 02A4h, etc., corresponding to bits AA8 through AH16.

Figure 5:
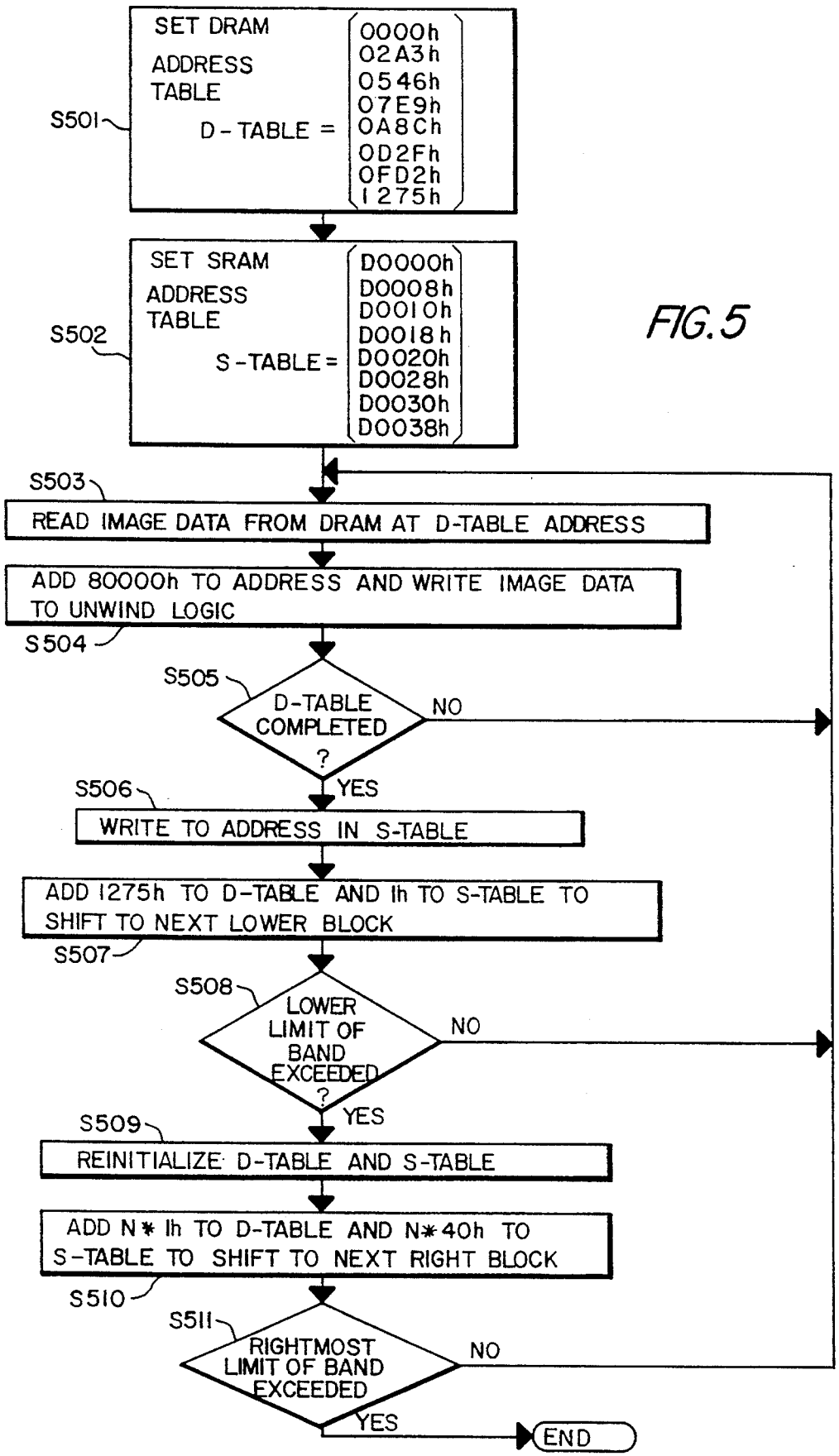
FIG. 5 is a flow diagram to illustrate how image data is selected for unwinding.
Figure 7:
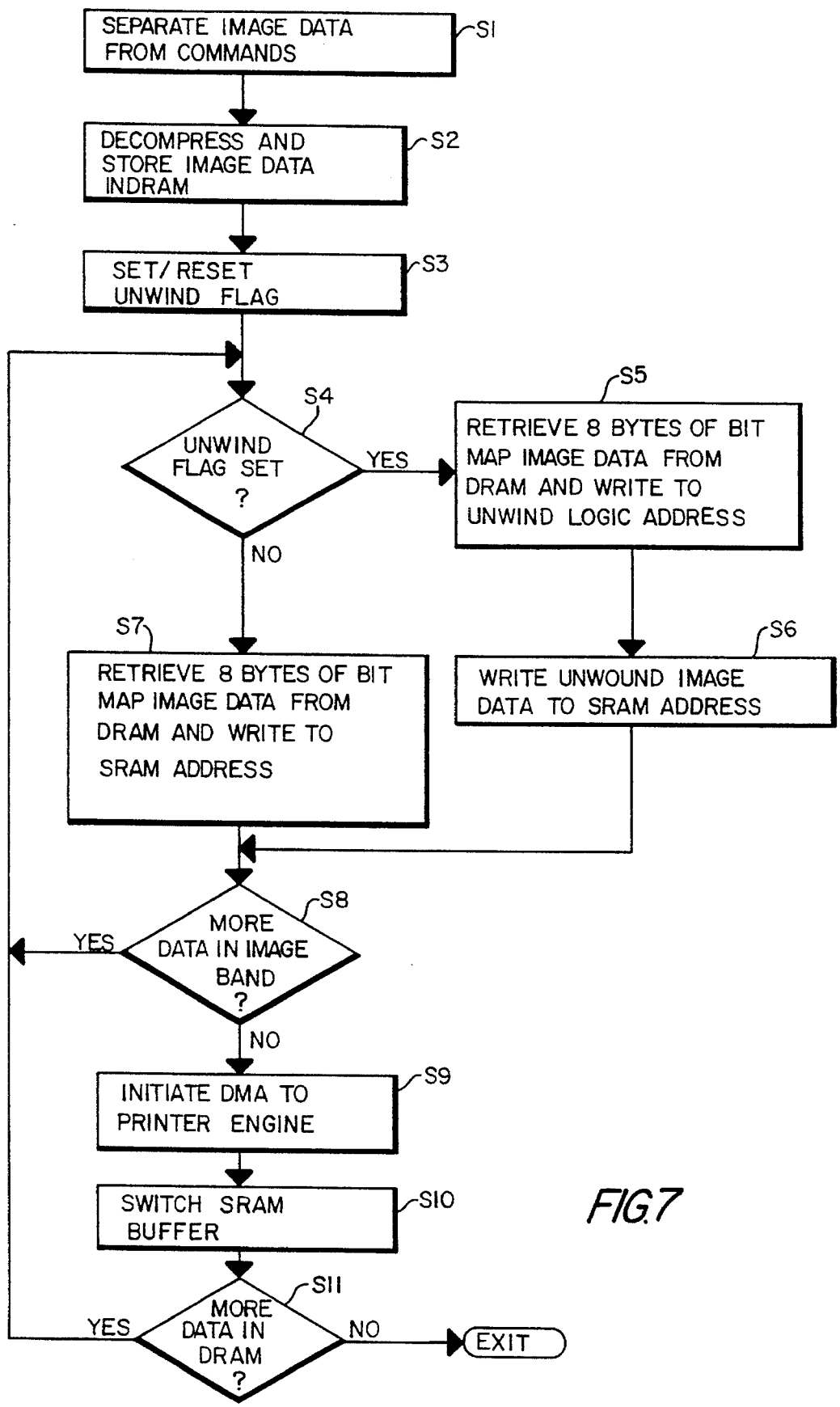
FIG. 7 is a flow chart for the FIG. 2 controller.
Figure 8A:
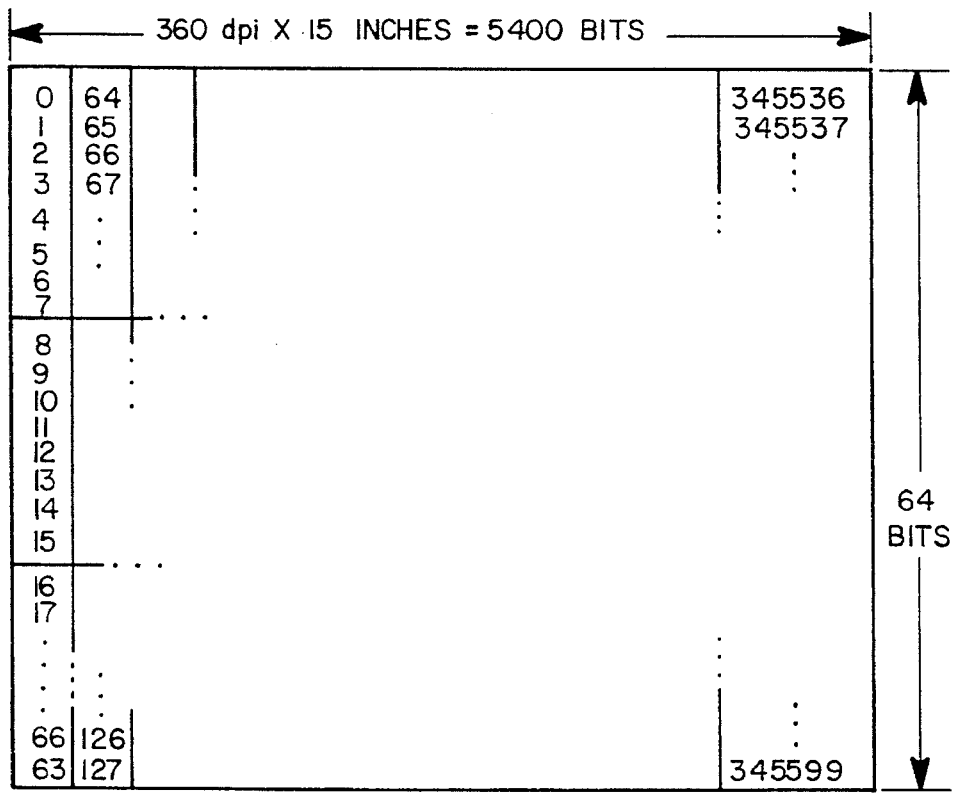
Figure 8:
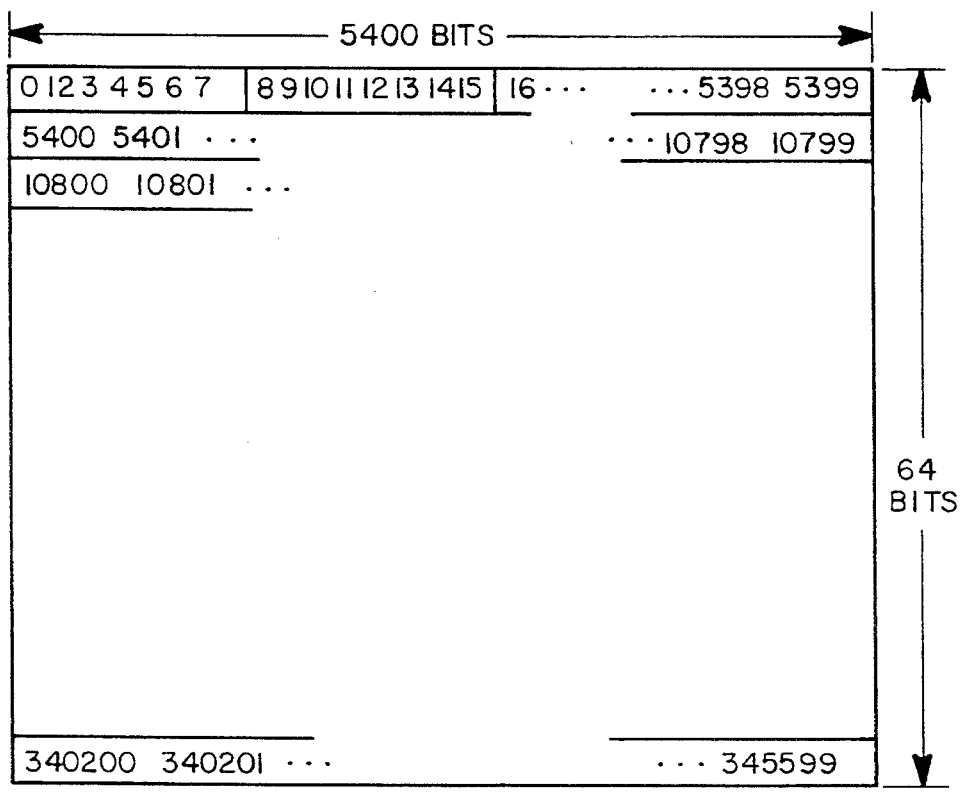
FIG. 8, comprising

FIG. 7 is a flow chart showing how eight-by-eight bit blocks of data are selected from the band of image data, and how these bits are unwound from row-ordered format in DRAM to column-ordered format in SRAM. The process steps depicted in FIG. 5 are stored in EPROM 34 and executed in CPU 30. As shown in step S501, CPU 30 first sets a DRAM address table consisting of the eight addresses corresponding to block 87 of image data. In step S502, CPU 30 sets a similar address table for SRAM. In step S503, CPU 30 reads row-ordered image data from DRAM 37 in accordance with the first address shown in the DRAM table. 80000h is added to the address in step S504 and CPU 30 writes the image data from DRAM 37 to this new address. As described above, the write in step S504 causes the image data to be latched in one of latches 60 through 67.

In step S505, CPU 30 determines if all eight addresses in the DRAM table have been written to the unwind logic. If they have not, flow returns to step S503 until all eight addresses have been written to latches 60 to 67 in unwind logic 40.

When a full eight-by-eight bit block of row-ordered image data has been written and latched in latches 60 to 67, flow advances to step S506 in which CPU 30 writes to the eight addresses in the SRAM table set in step S502. This causes the column-ordered image data buffered in buffers 71 through 78 to be written in column-ordered format to the SRAM addresses as described above.

In step S507, the next lower eight-by-eight bit block of image data is selected by adding 1275h to the addresses in the DRAM table and by adding 1h to the addresses shown in the SRAM table. In step S508 CPU 30 determines whether the lower limit of the band of image data has been exceeded. If the lower limit has not been exceeded, flow returns to step S503 in which the newly-selected eight-by-eight bit block of row-ordered image data is reformatted into column-ordered format.

If in step S508 the lower limit of the band of image data has been exceeded, then CPU 30 reinitializes the DRAM table and the SRAM table (step S509). In step S510, CPU 30 selects the next right-most eight-by-eight bit block of image data by adding N times 1h to the addresses shown in the DRAM table and by adding N times 40h to the addresses shown in the SRAM table. (N is the number of times this instruction has been executed and causes the next right-most eight-by-eight bit block of image data to be selected across the band of image data.) In step S511, CPU 30 inspects the resulting addresses to determine if the right-most limit of the band of image data has been exceeded. If it has not been exceeded then flow returns to step S503 to unwind the newly-selected eight-by-eight bit block of row-ordered image data into column-ordered image data into SRAM. On the other hand, if the right-most limit has been exceeded, then the entire band of image has been processed and flow terminates.

The overall process, including a selection of whether or not to unwind image data, is depicted in the flow chart of FIG. 7. The process steps depicted in FIG. 7 are stored in EPROM 34 and executed by CPU 30. As shown in step S1, CPU 30 first receives image data and commands over interface 14 and separates the image data from commands. If necessary, in step S2, the image data is decompressed and the decompressed image data is stored in DRAM 37. In step S3, CPU 30 sets or resets the unwind flag in accordance with a command from driver 13 on interface 14. For example, if the data transmitted to DRAM 37 is landscape data, then unwinding is often not needed, and the unwind flag is set low. In step S4, the unwind flag is interrogated. If the unwind flag is set, indicating that data unwinding is desired, then in step S5, CPU 30 retrieves eight bytes of bit map image data from DRAM 37, as detailed in FIG. 5, and writes the eight bytes to SRAM (step S6). On the other hand, if in step S4 the unwind flag is not set, CPU 30 retrieves the same eight bytes of bit map image data from DRAM 37, adds D0000h or E0000h to the DRAM address so as to obtain a corresponding SRAM address, and writes them to SRAM directly (step S7).

In step S8, CPU 30 determines whether there is any more data in the image band currently being created in SRAM 42. If there is more data, then flow proceeds to step S4. If, on the other hand, there is no more data in the image band, then in step S9 CPU 30 initiates DMA transfer of the image data in SRAM 42 to the printer engine. In step S10, PAL 38 switches the SRAM double buffer and flow returns to step S4 so that, in parallel with DMA transfer of image data to the printer engine, processing of the next band of image data may proceed, until in step S11 it is determined that all image data has been processed.

What is claimed is:

1. Apparatus for reformatting image data comprising:

a memory partitioned into at least a first address space which corresponds to physical memory for storing image data having one of a row format and a column format, a second address space which does not correspond to physical memory and a third address space which corresponds to physical memory for storing reformatted image data;

writing means for writing a predetermined N×N block of the image data having one of the row format and the column format from the first address space to the second address space so as to initiate conversion of the predetermined N×N block of image data to the other of the row format and the column format, and for subsequently writing the predetermined N×N block of image data to the third address space;

converting means which, in response to the image data being written to the second address space, converts the predetermined N×N block of image data from the one of the row format and the column format into the other of the row format and the column format; and outputting means responsive to said writing means writing to the third address space, for storing the predetermined N×N block of image data which has been converted by said converting means into the other of the row format and the column format, to said memory at the third address space.

2. Apparatus according to claim 1, further comprising selection means for selecting one of the row format and the column format, and a second output means responsive to said writing means writing to the third address space for outputting the predetermined N×N block of image data in the one of the row format and the column format, wherein said output means and said second output means are complementarily responsive to said selection means.

3. Apparatus according to claim 2, further comprising means for accepting commands over an interface, wherein said selection means is responsive to a command for selecting the one of the row format and the column format.

4. Apparatus according to claim 1, further comprising a interface, wherein said writing means is adapted to accept image data from said interface.

5. Apparatus according to claim 4, wherein at least some of the image data is compressed and wherein said writing means is adapted to decompress the compressed image data.

6. Apparatus according to claim 5, further comprising a bit map memory, wherein said writing means is adapted to store the decompressed image data in said bit map memory.

7. Apparatus according to claim 1, wherein said output means comprises a DMA output channel.

8. Apparatus according to claim 7, wherein said DMA channel is double buffered.

9. Apparatus according to claim 1, further comprising a printer and a printer engine, wherein said printer includes a print head adapted to print plural rows simultaneously.

10. Apparatus according to claim 1, wherein said converting means comprises plural latches for latching respective bytes of image data in the one of the row format and the column format, and plural buffers, each of which is connected to each of said plural latches, for converting image data into the other of the row format and the column format.

11. Apparatus according to claim 10, wherein there are N latches and N buffers.

12. Apparatus according to claim 10, further comprising a first multiplexer for activating one of said plural latches based on address data, and a second multiplexer for activating one of said plural buffers based on address data.

13. Apparatus according to claim 12, wherein said first multiplexer is responsive to least significant bits of address data and wherein said second multiplexer is responsive to next least significant bits.

14. A method for printing image data comprising the steps of:

receiving image data and commands;

storing the received image data in one of a row format and a column format at a first address space which corresponds to physical memory;

writing a predetermined N×N block of the stored image data to a second address space which does not correspond to physical memory, so as to initiate conversion of the predetermined N×N block of image data to the other of the row format and the column format;

converting the predetermined N×N block of image data written to the second address space to the other of the row format and the column format;

writing to a third address space which corresponds to physical memory for storing reformatted image data;

storing the predetermined N×N block of image data converted in said step of converting in the third address space in response to writing to the third address space; and printing the predetermined N×N block of image data stored in said step of storing.

15. A method according to claim 14, further comprising the step of selecting to store, in said step of storing, one of the predetermined N×N block of image data in the one of the row format and the column format and the predetermined N×N block of image data in the other of the row format and the column format.

16. A method according to claim 14, further comprising the steps of separating image data from commands and storing the image data in a bit map memory.

17. A method according to claim 16, wherein at least some of the image data is compressed image data and further comprising the step of decompressing the compressed image data.

18. An apparatus for converting row-formatted image data into column-formatted image data comprising:

a memory partitioned into a first address space corresponding to physical memory which stores row-formatted image data, a second address space which does not correspond to physical memory and a third address space which corresponds to physical memory which stores reformatted image data;

a processor which initiates N writes to the second address space so as to write a predetermined N×N block of the row-formatted image data from the first address space to the second address space, thereby to initiate conversion of the predetermined N×N block of the row-formatted image data into column-formatted image data, and which subsequently initiates N writes to the third address space so as to write the column-formatted image data to the third address space;

a first multiplexer, responsive to said processor writing the predetermined N×N block of image data to the second address space, which decodes M least significant bits of address data to provide N sequential latch enable signals;

N latches, each of which is responsive to one of the N sequential latch enable signals provided by said first multiplexer, which latch the predetermined N×N block of row-formatted image data;

a second multiplexer, responsive to said processor writing to the third address space, which decodes next M consecutive least significant bits of address data to provide N sequential buffer control signals;

N buffers which receive and buffer the column-formatted image data, and which store the column-formatted image data in response to one of the N sequential buffer control signals provided by said second multiplexer; and interconnection wiring interposed between said N latches and said N buffers, over which, for each of the N latches, an Ith bit is transferred to an Ith of the N buffers and stored in an Ith position in the Ith buffer, in response to the N latch enable signals, where $I \leq N$.

19. An apparatus according to claim 18, wherein a number of said N latches is $2^M$ and a number of said N buffers is $2^M$, and wherein $2^M$ corresponds to a number of bytes comprising the predetermined N×N block of image data written from the first address space to the second address space.

* * * * *

UNITED STATES PATENT AND TRADEMARK OFFICE
CERTIFICATE OF CORRECTION

PATENT NO. : 5,511,151

DATED : April 23, 1996

INVENTOR(S) : William C. Russell, et al.

It is certified that error appears in the above-identified patent and that said Letters Patent is hereby corrected as shown below:

On the Title page, item [56]:

Under the heading "References Cited", change
"5,122,873    5/1992    Golin" to
--5,122,873    6/1992    Golin--; and insert

--OTHER PUBLICATIONS

"Simple Image Compression Technique", IBM Technical Disclosure Bulletin, Vol. 33, No. 8, January 1991, pp. 54-56.--.

Signed and Sealed this

First Day of October, 1996

Attest:

BRUCE LEHMAN

Attesting Officer      Commissioner of Patents and Trademarks